United States Patent [19]

Machida

[11] Patent Number: 5,372,770
[45] Date of Patent: Dec. 13, 1994

[54] INJECTION MOLDING METHOD, INJECTION MOLDING MACHINE, INJECTION MOLDING DIE AND HALF CASE OF MAGNETIC TAPE CASSETTE

[75] Inventor: Tetsuo Machida, Miyagi, Japan

[73] Assignee: Sony Corporation, Tokyo, Japan

[21] Appl. No.: 885,454

[22] Filed: May 19, 1992

[30] Foreign Application Priority Data

May 20, 1991 [JP] Japan ................. 3-114772
Oct. 8, 1991 [JP] Japan ................. 3-260763

[51] Int. Cl.⁵ ................. B29C 45/16; B29C 45/04
[52] U.S. Cl. ................. 264/255; 264/245; 264/328.7; 264/328.8; 264/328.9
[58] Field of Search ........... 264/255, 328.7, 328.8, 264/245, 328.9; 425/575

[56] References Cited

U.S. PATENT DOCUMENTS

| | | |
|---|---|---|
| 4,004,868 | 1/1977 | Ohdate . |
| 4,726,758 | 2/1988 | Sekine et al. ............... 425/575 |
| 4,840,760 | 6/1989 | Oishi ............... 264/255 |
| 5,084,223 | 1/1992 | Morita et al. ............... 264/245 |
| 5,094,602 | 3/1992 | Morita ............... 264/328.7 |
| 5,125,816 | 6/1992 | Morita ............... 264/328.7 |
| 5,186,955 | 2/1993 | Morita et al. ............... 264/328.8 |
| 5,192,481 | 3/1993 | Morita ............... 264/255 |

FOREIGN PATENT DOCUMENTS 63-295221 12/1988 Japan .
2205304 12/1988 United Kingdom .

*Primary Examiner*—Mathieu Vargot
*Attorney, Agent, or Firm*—Hill, Steadman & Simpson

[57] ABSTRACT

The present invention provides an injection molding die unit having a simple construction and an injection molding method employing the injection molding die unit and capable of molding a composite molding in a short cycle time. After molding a first molding (70), a male die (30) is moved together with the first molding (70) by a distance (Gb) in direction (L) and, at the same time, a movable female die (14B) of a composite female die (14) is moved by the same distance (Gb) in the same direction (L) by a coil spring (29) to form a space (72) between the male die (30) and the composite female die (14) consisting of the movable female die (14B) and a fixed female die (14A), and a second molding material is injected into the space (72) to form second molding (80).

10 Claims, 11 Drawing Sheets

INJECTION MOLDING METHOD, INJECTION MOLDING MACHINE, INJECTION MOLDING DIE AND HALF CASE OF MAGNETIC TAPE CASSETTE

BACKGROUND OF THE INVENTION

1. Field of the Invention

The present invention relates to an injection molding method to be applied to forming a molding, such as a half case of a video tape cassette or an audio tape cassette, by sequentially injecting different molding materials into a die cavity formed between a male die and a female die.

2. Description of the Prior Art

A half case of a video tape cassette or an audio tape cassette is formed by a two-color injection molding method of either a rotary system or a core-back system.

Rotary System

In forming a molding by a two-color injection molding method of a rotary system, a core die is turned in a plane perpendicular to a female die by a die inverting device to dispose the core die alternately opposite to a first cavity die and a second cavity die for two-stage molding. The two-color injection molding method of a rotary system needs two dies, i.e., the first cavity die and the second cavity die needs a long cycle time because the die must be opened after the completion of molding in the first cavity die to turn and transfer the first molding to the second cavity die and hence has a low productivity. Since the die is opened after the completion of the first molding cycle and a first molding is exposed to air before forming a composite molding by combining a second molding formed in the second molding cycle, the composite molding is liable to separate into the first molding and the second molding along the interface between the first and second moldings.

Core-back System

A two-color injection molding method of a core-back system has been proposed to solve the problems in the two-color injection molding method of a rotary system. A typical two-color injection molding method of a core-back system is disclosed in Japanese Unexamined Patent Publication (Kokai) No. Sho 63-293024 (Method of Molding a Two-color Half Case of a Tape Cassette). The gist of the invention disclosed in Japanese Unexamined Patent Publication (Kokai) No. Sho 63-293024 will be described hereinafter with reference to FIG. 18, which is a copy of FIG. 1 included in the specification of the same invention.

In injecting a first material into a cavity formed in a die consisting of female die 110 and a male die 115, a slide core 126 for forming windows in a half case of a tape cassette, movable on the male die 115 is projected toward the female die 110, a cavity core 122 movable on the female die 110 is projected so as to close spaces for the windows and the surface of a rim, and the first molding material is injected into a cavity formed between the female die 110 and the male die 115. Then, the slide core 126 and the cavity core 122 are retracted to form spaces to be filled up with a second molding material, and then the second molding material is injected into the spaces to complete a half case.

An invention disclosed in Japanese Unexamined Patent Publication (Kokai) No. Sho 57-187228 proposed to eliminate disadvantages in this two-color injection molding method of a core-back system that dimples are formed in the surface of the molding and the die is subject to damaging employs a slide core 5 provided with a recess 16 in its contact surface facing a gate as shown in FIG. 19A and 19B, which is a copy of FIG. 4 included in the specification of Japanese Unexamined Patent Publication (Kokai) No. Sho. 57-187228.

The die employed in the two-color injection molding method of a core-back system has a complicated construction, which affects adversely to molding efficiency and causes the following problems.

1. Low productivity

Since the die has a complicated construction, it is difficult to form an effective cooling passage in the die, the core-back system needs a long cycle time, troubles occur frequently during the process and the reliability of the die is not high enough.

2. Low economic effect

The die having a complicated construction is expensive and requires much time for fabrication. Nevertheless, it is difficult to obtain a die capable of satisfactorily improving the productivity.

3. Low degree of freedom of design

There are many restrictions on the design of the die to give high priority to reliability and it is difficult to incorporate improvements into the die.

The foregoing method of preventing defects attributable to a gate drop has the following problems.

1. Problems in commercial value

Since the depth of the recess formed in the contact surface of the slide core facing the gate must be considerably large to avoid crushing the gate drop by the slide core, grooves having a pattern spoiling the design of the half case are formed around the transparent portion of the half case, for example, a portion around the windows.

2. Problems in strength

The wall thickness of the portion of the half case in which the grooves are formed in an undesirable pattern around the windows is smaller than that of other portions of the half case, which affects adversely to the strength of the half case.

3. Problems in production

In some cases, the die was broken due to fatigue when the width of the contact surface was increased to attach importance to design and the wide contact surface obstructed the flow of the molten resin to deteriorate moldability.

SUMMARY OF THE INVENTION

Accordingly, the present invention has been made to solve those problems in the prior art.

An injection molding method in one aspect of the present invention comprises steps of: injection-molding a first portion of a half case by injecting a first molding material into a cavity defined by a male die and a female die for a first molding cycle; cooling the first portion; separating the first portion together with either the male die or the female die from the other die; injection-molding a second portion of the half case by injecting a second molding material into the cavity defined by the male die and the female die for a second molding cycle; and, if necessary, repeating the second molding cycle to complete the half case. This injection molding method in accordance with the present invention will be designated as "body-back injection molding method" to discriminate the injection molding method from the prior art injection molding method.

The body-back injection molding method in accordance with the present invention enables the fabrication of a multicolor-laminate molding or a multicolor-blocked molding by sequentially carrying out injection molding cycles in which molding materials of different colors are used. Thus, the present invention is applicable to fabricating moldings of original designs, enables the use of an injection molding die having a simple construction and curtails the cost and time required for fabricating the injection molding die.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
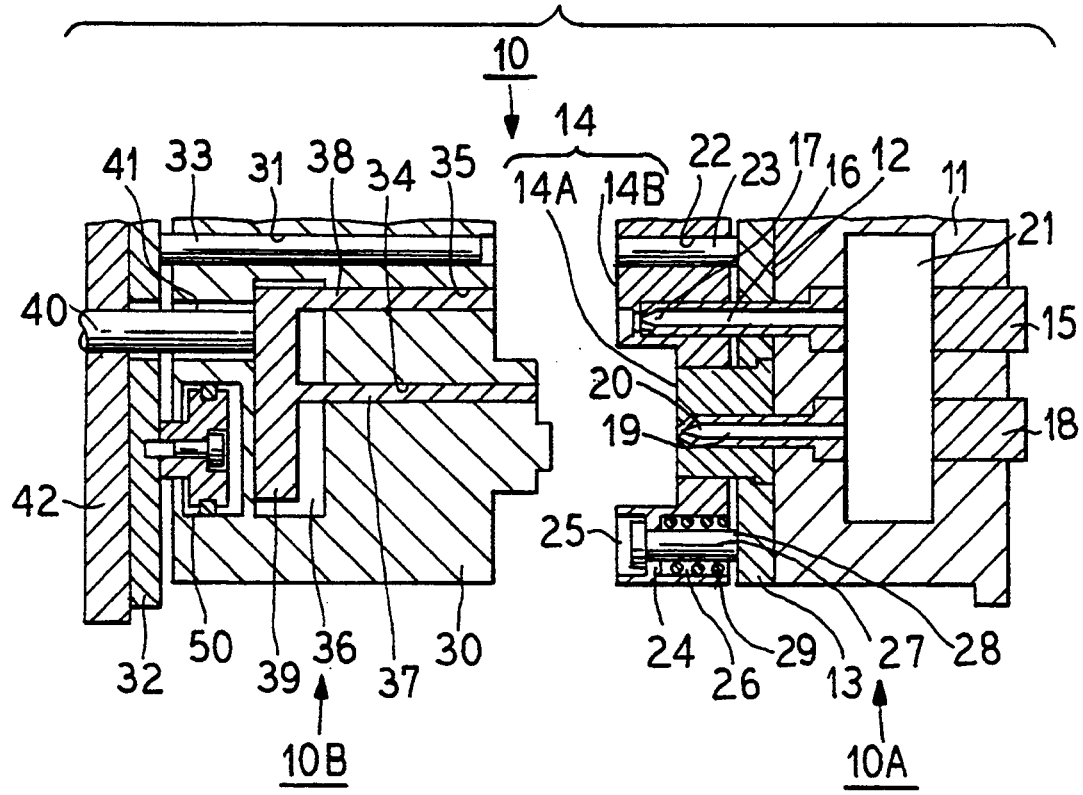
FIG. 1 is a sectional view of an injection molding die included in an injection molding machine in a first embodiment according to the present invention for carrying out an injection molding method embodying the present invention.
Figure 2:
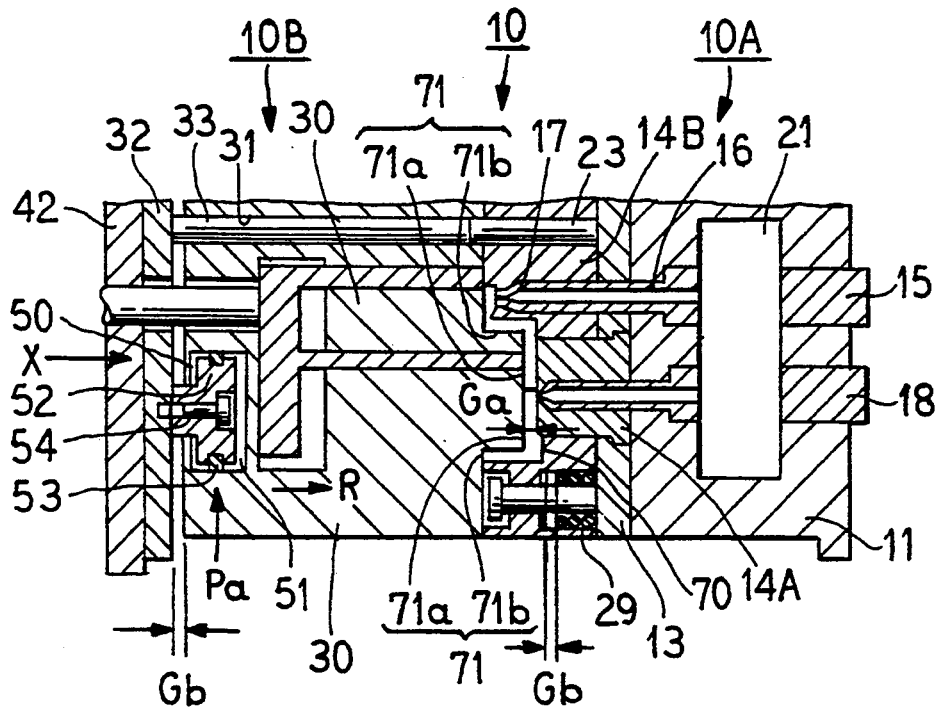
FIG. 2 is a sectional view of assistance in explaining a step of the injection molding method embodying the present invention.
Figure 3:
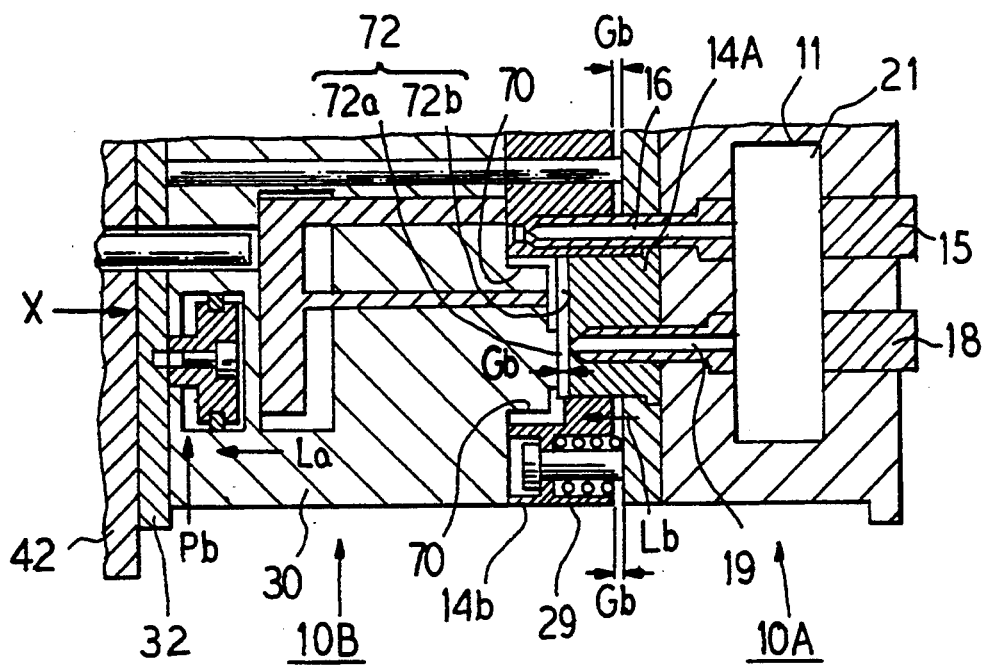
FIG. 3 is a sectional view of assistance in explaining a step of the injection molding method subsequent to the step explained with reference to FIG. 2.
Figure 4:
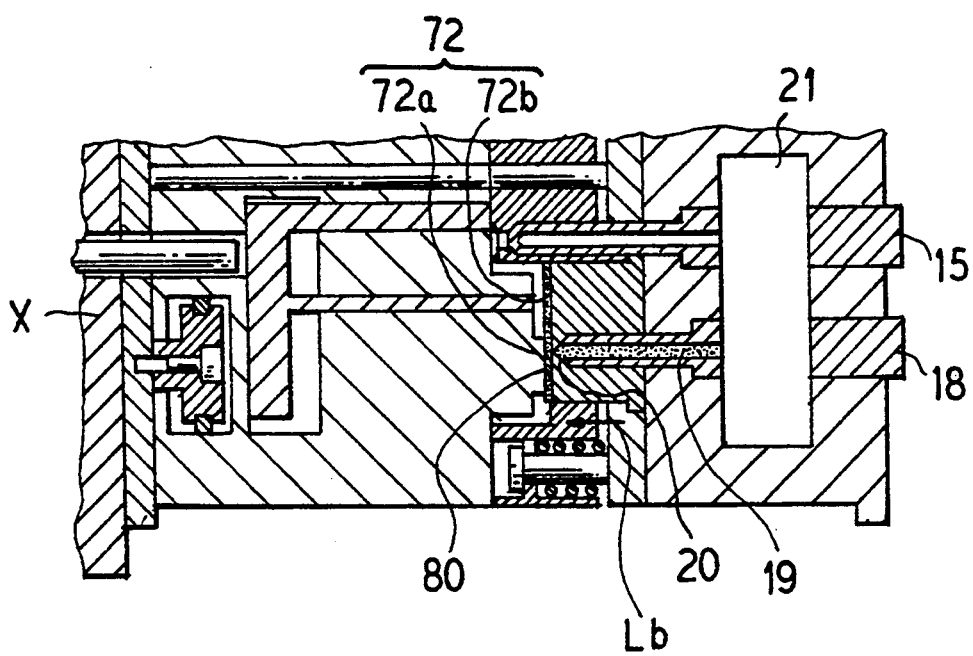
FIG. 4 is a sectional view of assistance in explaining a step of the injection molding method subsequent to the step explained with reference to FIG. 3.
Figure 5:
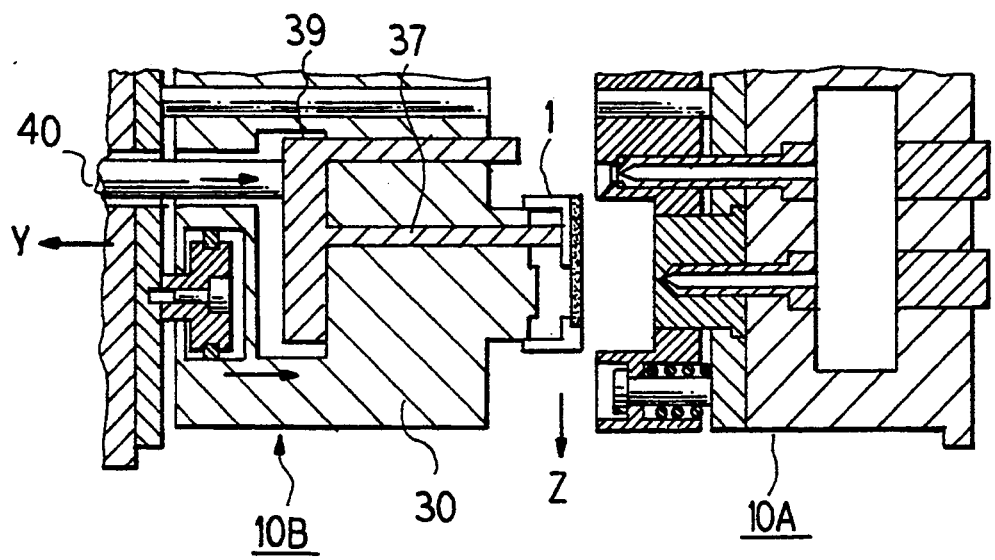
FIG. 5 is a sectional view of assistance in explaining a step of the injection molding method subsequent to the step explained with reference to FIG. 4.
Figure 6A:
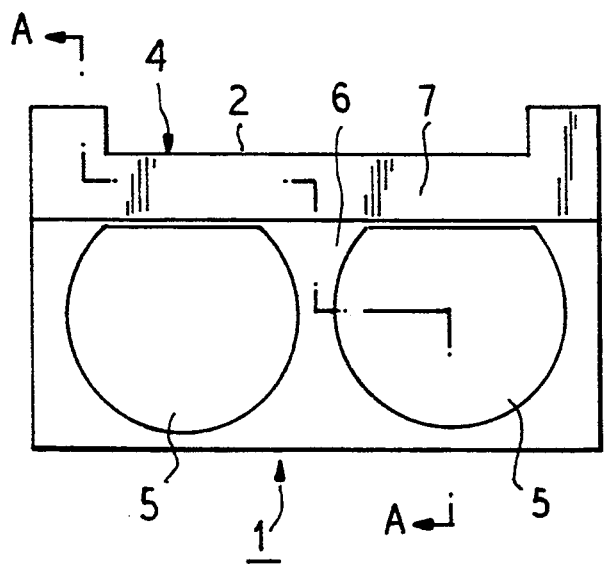
FIG. 6A is a plan view of a half case of an 8 mm video tape cassette formed by the injection molding method embodying the present invention.
Figure 6B:
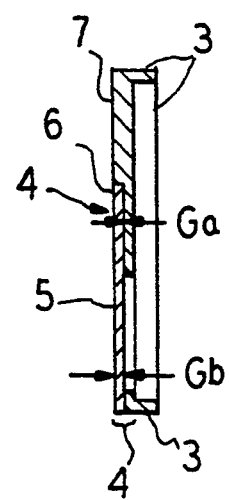
FIG. 6B is a sectional view taken on line A—A in FIG. 6A.

FIG. 1 is a sectional view of an injection molding machine for carrying out an injection molding method in a first embodiment according to the present invention, and FIGS. 2 to 5 show the injection molding machine in different steps of the injection molding method, in which FIG. 2 shows a state where a first molding material has been injected into a die for the first injection molding cycle, FIG. 3 shows a state where a first partial molding has been moved, FIG. 4 shows a state where a second molding material has been injected into the die for the second injection molding cycle to form a second partial molding and FIG. 5 shows a state where a complete molding consisting of the first and second partial moldings is being removed from the die. FIGS. 6A and 6B show a half case of an 8 mm video tape cassette.

The injection molding method will be described as applied to forming a half case of an 8 mm video tape cassette.

Referring to FIGS. 6A and 6B, a half case 1 of an 8 mm video tape cassette consists of a bottom wall 4, and a side wall 3 extending along the three sides of the bottom wall 4, i.e., the sides other than the front side 2 to which a front cover, not shown, which is opened in operating a magnetic tape, not shown, contained in the video tape cassette and closed to protect the magnetic tape is connected. The bottom wall 4 is provided with windows 5 to enable observation of the magnetic tape and has covering sections 6 and 7. The rim 3 and the covering section 7 are formed, for example, of an opaque colored molding material, and the windows are formed, for example, of a transparent or translucent colored molding material. The covering section 6 has a two-layer laminate construction consisting of a lower layer formed of the molding material forming the covering section 7 integrally with the covering section 7, and an upper layer formed of the molding material forming the windows 5 integrally with the windows 5. Note that a molding of an original, beautiful design, which has been difficult to fabricate, can be relatively easily fabricated at a relatively low cost by molding molding materials differing from each other in transparency, color and/or quality.

The construction of an injection molding machine suitable for molding the half case 1 will be described hereinafter with reference to FIG. 1 showing an injection molding die unit 10 consisting of a fixed die assembly 10A and a movable die assembly 10B, and the associated parts.

The fixed die assembly 10A has a composite female die 14 consisting of a fixed female die 14A and a movable female die 14B. The fixed die assembly 10A is held fixedly on the datum surface 12 of a base 11 by a holding plate 13. A cavity surface corresponding to the outer surface of the half case 1 is formed in the composite female die 14. A first injector 15 having a first injection nozzle 16 is held on the base 11, and the first injection nozzle 16 extends through a manifold block 21, the holding plate 13 and the movable female die 14B. The gate 17 of the first injection nozzle 16 opens in the cavity surface of the movable female die 14B. A second injector 18 held on the base 11 has a second injection nozzle 19 extending through the manifold block 21 and the fixed female die 14A. The gate 20 of the second injection nozzle 19 opens in the cavity surface of the fixed female die 14A. The movable female die 14B is provided with a guide hole 22, and a guide rod 23 projecting from the holding plate 13 and perpendicular to the surface of the holding plate 13 is received in the guide hole 22 to guide the movable female die 14B for axial movement. Recesses 25 and 26 separated by a partition wall 24 provided with a through hole are formed in the movable female die 14B. A headed rod 27 having a head and a straight section is inserted through the through hole in the recesses 25 and 26 with the head thereof received in the recess 25, with the straight section thereof extending in the recess 26 and with the extremity 28 of the straight section in contact with the surface of the holding plate 13. A coil spring 29 is put in the recess 26 around the straight section of the headed rod 27 to bias the movable female die 14B constantly to the left, as viewed in FIG. 1, i.e., toward the movable die assembly 10B, so that a gap is formed between the fixed female die 14A and the movable female die 14B. The coil spring 29 may be substituted by a hydraulic unit or the like.

The movable die assembly 10B of the injection molding die unit 10 has a male die 30 having a core surface corresponding to the inner surface of the half case 1 and provided with a guide hole 31. A guide rod 33 projecting from a base plate 32 and perpendicular to the surface of the base plate 32 is received in the guide hole 31 of the male die 30 to guide the male die 30 for axial movement. A hydraulic cylinder actuator 50 is built in the male die 30 to move the male die 30 toward the composite female die 14.

The hydraulic cylinder actuator 50 has a pressure chamber 51 formed in the left end of the male die 30, a piston 52 fitted in the pressure chamber 51, a piston ring 53 put on the circumference of the piston 52, and a shaft 54 having one end fixed to the piston 52 and the other end fixed to the base plate 32. FIGS. 7A, 7B, 8A and 8B show modifications of the hydraulic cylinder actuator 50, which will be described later.

The male die 30 is provided with two parallel guide holes 34 and 35 parallel to the guide hole 31. The guide holes 34 and 35 open into a chamber 36 having a rectangular cross section. An ejecting pin 37 and a return pin 38 projecting from the surface of an ejecting plate 39 disposed within the chamber 36 and perpendicular to the same surface are received respectively in the guide holes 34 and 35. The ejecting pin 37 and the ejecting plate 39 separate a molding from the male die 30 and eject the same from the injection molding die unit 10. The chamber 36 has a width large enough to enable the ejecting plate 39 to be pushed by an ejecting rod to the right, as viewed in FIG. 1, to eject a molding. A through hole 41 is formed in the back portion of the male die 30 to receive the ejecting rod 40 therethrough into the chamber 36. Although only one ejecting pin 37 is shown in FIG. 1, the male die 30 is provided with a plurality of ejecting pins; the number of the ejecting pins is dependent on the size and shape of a molding to be molded in the injection molding die unit 10. The male die 30 is attached to the base plate 32 which in turn is fixed to the die base 42 of the injection molding machine.

Steps of forming the half case shown in FIGS. 6A and 6B by the injection molding method employing the injection molding die unit 10 thus constructed will be described hereinafter with reference to FIGS. 2 to 5.

FIG. 2 shows the injection molding die unit 10 in a state for the first injection molding cycle for forming a first molding 70. The injection molding die unit 10 is mounted on the injection molding machine with the fixed die assembly 10A fixed to the injection molding machine and with the movable die assembly 10B fixed to the die base 42 of the hydraulic unit, not shown. A predetermined pressure is applied to the die base 42 in the direction of the arrow X to close the injection molding die unit 10. A hydraulic pressure is applied to a front chamber Pa of the pressure chamber 51, a pressure chamber in front of the piston 52, of the hydraulic cylinder actuator 50 to move the male die 30 in the direction of the arrow R. Then, the upper and lower recessed surfaces of the male die 30 comes into contact respectively with the upper and lower protruding surfaces of the movable female die 14B of the composite female die 14 and pushes the movable female die 14B backward against the resilience of the coil spring 29 to press the back surface of the movable female die 14B against the holding plate In this state, the front end of the guide rod 23 is received in the guide hole 31 and in contact with the guide rod 33 to define a gap of a size Ga between the cavity surface of the composite female die 14 and the core surface of the male die 30 defining a space 71 into which a first molding material is injected. The size Ga of the gap is equal to the thickness Ga of the covering section 6 of the bottom wall 4 of the half case 1 (FIG. 6B). A distance Gb by which the movable female die 14B is pushed backward is equal to the width of a space into which a second molding material is injected, i.e., the thickness of a second layer. The space 71 consists of a space 71a corresponding to the covering sections 6 and 7 of the half case 1, and a space 71b corresponding to the rim 3 of the half case 1 (FIGS. 6A and 6B).

A first injecting unit 15 injects the first molding material, for example, a colored plastic resin, such as a black plastic resin, through the manifold block 21 and the first injection nozzle 16 into the space 71 having a width equal to the size Ga, and then the first molding material injected into the space 71 is cooled to form the first molding 70 forming a first layer of a first color of the half case 1.

Subsequently, hydraulic pressure is removed from the front chamber Pa and applied to a back chamber Pb, i.e., a pressure chamber behind the piston 52, of the hydraulic cylinder actuator 50. Then, as shown in FIG. 3, the male die 30 of the movable die assembly 10B is moved back ward together with the first molding 70 in the direction of the arrow La by a distance equal to the thickness of a second layer to be formed, i.e., a distance equal to the distance Gb and, consequently, the back surface of the male die 30 is brought into contact with the surface of the base plate 32. At the same time, the movable female die 14B is moved in the direction of the arrow Lb by the resilience of the coil spring 29. While the movable female die 14B is being moved in the direction of the arrow Lb, the upper and lower protruding surfaces of the movable female die 14B remain in contact respectively with the upper and lower recessed surfaces of the male die 30. Consequently, the cavity surface of the composite female die 14 as shown in FIG. 1 is formed, and a space 72 is formed between the cavity surface of the composite female die 14 and the exposed surface, i.e., the surface facing the cavity surface of the composite female die 14, of the first molding 70 adhering to the core surface of the male die 30. The space 72 corresponds to a second molding. The space 72 has a portion 72a corresponding to the windows 5 of the half case 1 (FIG. 6A) and a portion 72b corresponding to an upper layer for the covering section 6 of the half case 1.

Then, as shown in FIG. 4, a second molding material, for example, a transparent second plastic resin of a second color, is injected through the manifold block 21, the second injection nozzle 19 and the gate 20 into the space 72 by the second injector 18 for the second injection molding cycle to form a second molding 80 forming a second layer, and then, the second plastic material injected into the space 72 is cooled. Thus, the transparent windows 5 of a single-layer construction and the covering sections 6 and 7 of a two-layer construction consisting of the first layer of the black first molding formed by the first injection molding cycle and the second layer of the transparent second molding formed by the second injection molding cycle.

Subsequently, as shown in FIG. 5, the movable die assembly 10B is moved in the direction of the arrow Y by the hydraulic unit to open the injection molding die unit 10 and the ejecting plate 39 is pressed by the ejecting rod 40 to separate the half case 1 of a two-layer laminate construction from the male die 30 and to eject the half case 1 from the injection molding die unit 10 in the direction of the arrow Z with the ejecting pin 37.

As is obvious from the foregoing description, the injection molding die unit 10 is constructed so that the male die 30 with the first molding 70 and the movable female die 14B can be moved toward the die base 42 by the distance Gb equal to the width of the space 72 for molding the second molding, and the distance Gb is determined by the length of the headed rod 27. Thus, this injection molding method is designated as "body-back injection molding method".

It is possible, on principle, to interchange the fixed die assembly 10A and the movable die assembly 10B, namely, it is possible to mount the fixed die assembly 10A including the composite female die 14 on a movable member of the injection molding machine and to mount the movable die assembly 10B including the male die 30 on the fixed member of the injection molding machine for the same effect.

Figure 7A:
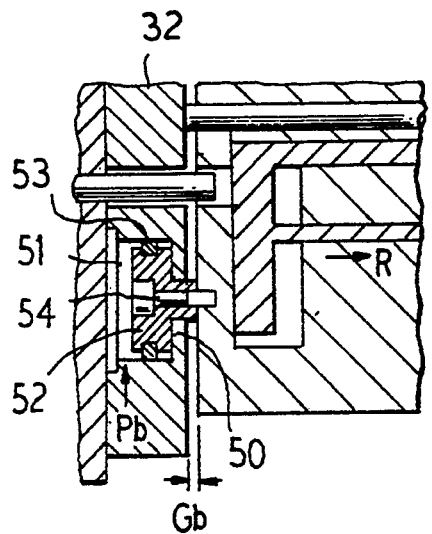
FIGS. 7A and 7B are sectional views of a hydraulic cylinder actuator built in a first modification of the injection molding die unit shown in FIG. 1.
Figure 7B:
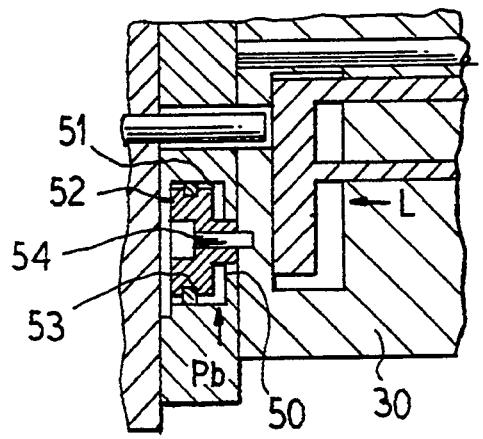
Figure 8A:
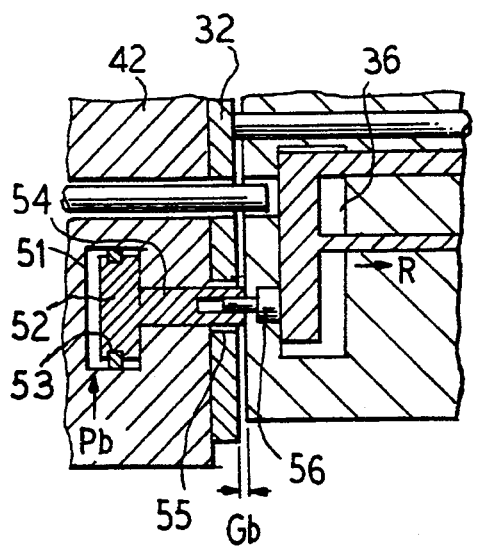
FIGS. 8A and 8B are sectional views of a hydraulic cylinder actuator employed built in a second modification of the injection molding die unit shown in FIG. 1.
Figure 8B:
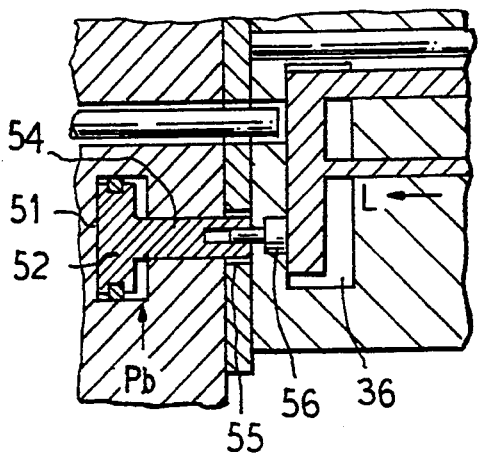

The hydraulic cylinder actuator 50 may be built in the base plate 32 or the die base 42 of the injection molding machine instead of building the same in the male die 30. FIGS. 7A and 7B show a hydraulic cylinder actuator built in a base plate and employed in an injection molding machine in a second embodiment according to the present invention and FIGS. 8A and 8B show a hydraulic cylinder actuator built in a die base and employed in an injection molding machine in a third embodiment according to the present invention, in which parts like or corresponding to those of the injection molding machine shown in FIG. 1 are denoted by the same reference characters.

The injection molding machine in the second embodiment according to the present invention will be described with reference to FIG. 7A corresponding to FIG. 2, and FIG. 7B corresponding to FIG. 3. A hydraulic cylinder actuator 50 has a pressure chamber 51 formed in a base plate 32, a piston 52 fitted in the pressure chamber 51, a piston ring put on the circumference of the piston 52, and a shaft 54 having one end connected to the piston 52 and the other end fixed to a male die 30. A hydraulic pressure is applied to a back chamber Pa, i.e., a chamber behind the piston 52, as shown in FIG. 7A to move the male die 30 and the piston 52 in the direction of the arrow R with the shaft 54 so that a gap of a width Gb is formed between the male die 30 and the base plate 32. The width Gb is equal to the width of the space into which the second molding material is injected to form the second molding forming the second layer. Hydraulic pressure is removed from the back chamber Pa and applied to a front chamber Pb, i.e., a chamber in front of the piston 52, as shown in FIG. 7B to pull the male die 30 with the shaft 54 so that the male die 30 is brought into contact with the base plate 32.

The injection molding machine in a third embodiment according to the present invention will be described with reference to FIGS. 8A and 8B. The injection molding machine is provided with a hydraulic cylinder actuator 50 built in its die base 42. The hydraulic cylinder actuator 50 has a pressure chamber 51 formed in the die base 42, a piston 52 fitted in the pressure chamber 51, a piston ring 53 put on the circumference of the piston 52, and a shaft 54 having one end fixed to the piston 52 and the other end extending through a through hole 55 formed in a base plate 32 and joined to the back surface of a male die 30. The shaft 54 is fastened to the male die 30 with a screw 56. The operation of the hydraulic cylinder actuator 50 for forming the gap of the width Gb is the same as that of the hydraulic cylinder actuator 50 shown in FIGS. 7A and 7B, and hence the description thereof will be omitted.

Although the injection molding method embodying the present invention has been described as applied to molding the half case 1 of a two-color, two-layer laminate construction, it is possible to apply the injection molding method to fabricating a molding of a multi-color, multilayer laminate construction by employing an appropriate modification of the composite female die 14.

Figure 9:
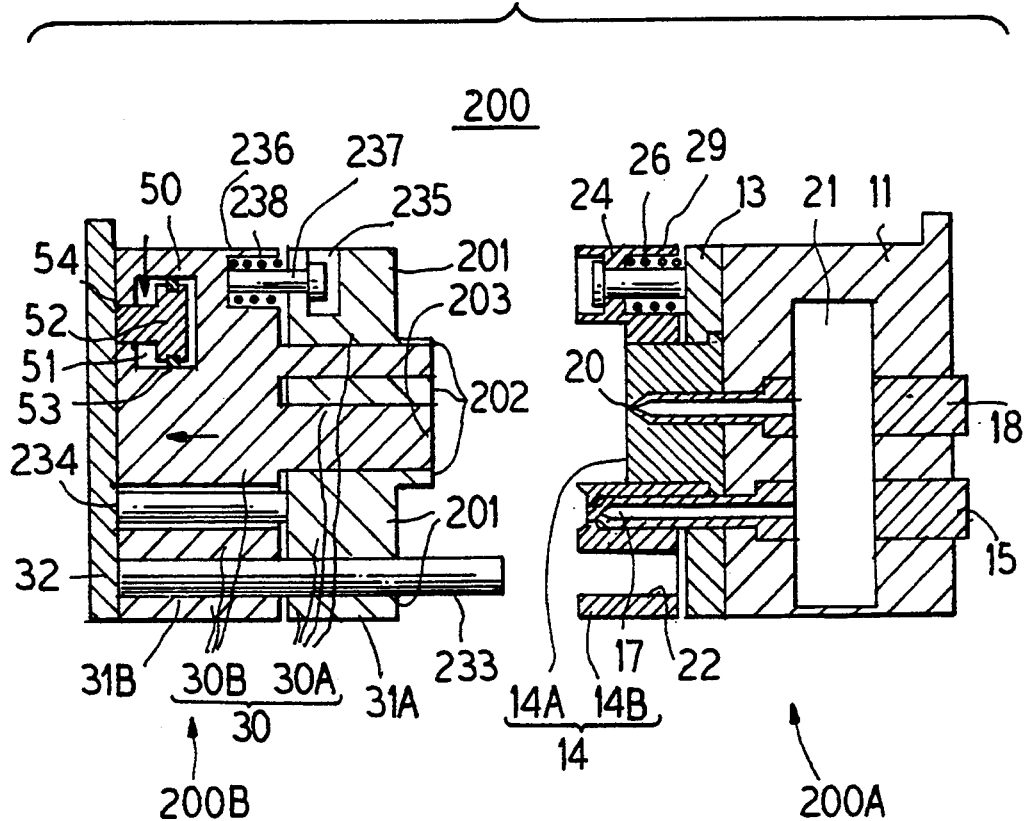
FIG. 9 is a sectional view of an injection molding die unit included in an injection molding machine in a second embodiment according to the present invention.
Figure 10:
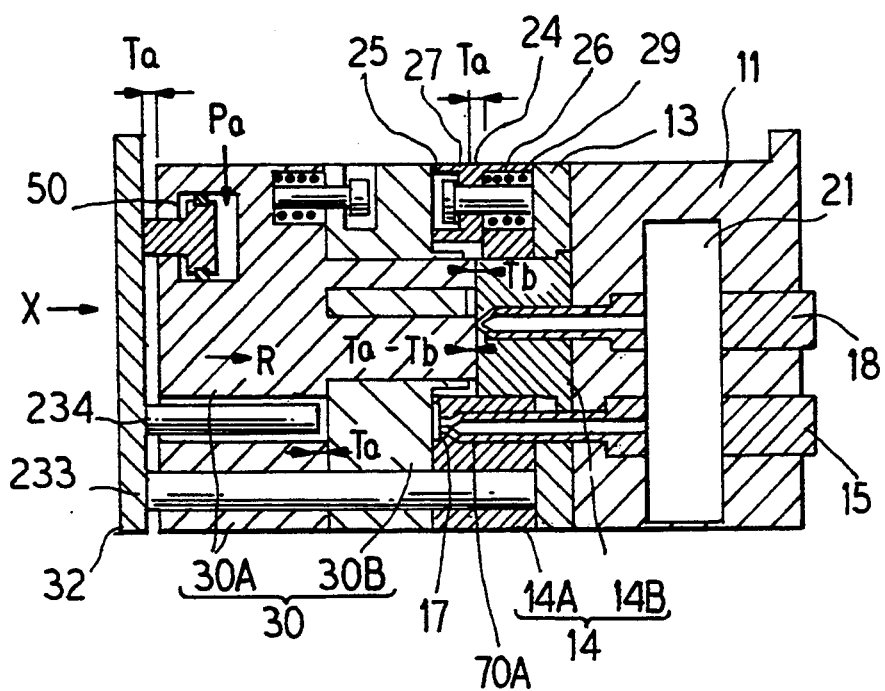
FIG. 10 is a sectional view of assistance in explaining the operation of the injection molding machine in the second embodiment according to the present invention.
Figure 11:
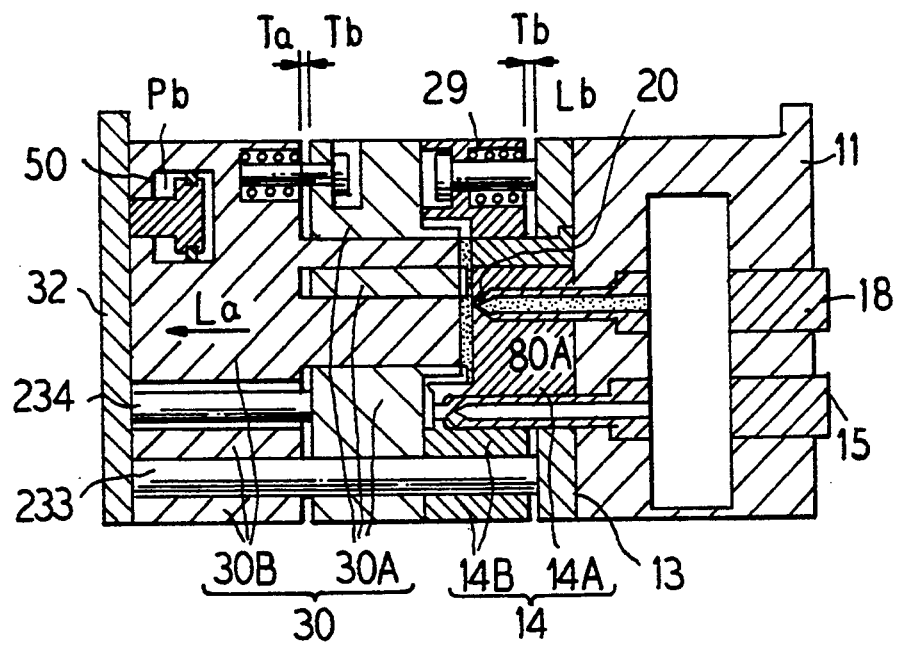
FIG. 11 is a sectional view of assistance in explaining the operation of the injection molding machine in the second embodiment according to the present invention.

An injection molding machine in a second embodiment according to the present invention will be described with reference to FIGS. 9 to 12B as applied to molding a half case of a compact tape cassette. FIG. 9 is a sectional view showing an essential portion of the injection molding machine, FIGS. 10 and 11 show the injection molding machine in the first injection molding cycle and in the second injection molding cycle, respectively, and FIGS. 12A and 12B show a half case of a compact tape cassette formed by the injection molding method, in which parts like or corresponding to those of the injection molding machine previously described with reference to FIGS. 1 to 6B are denoted by the same reference characters.

Figure 12A:
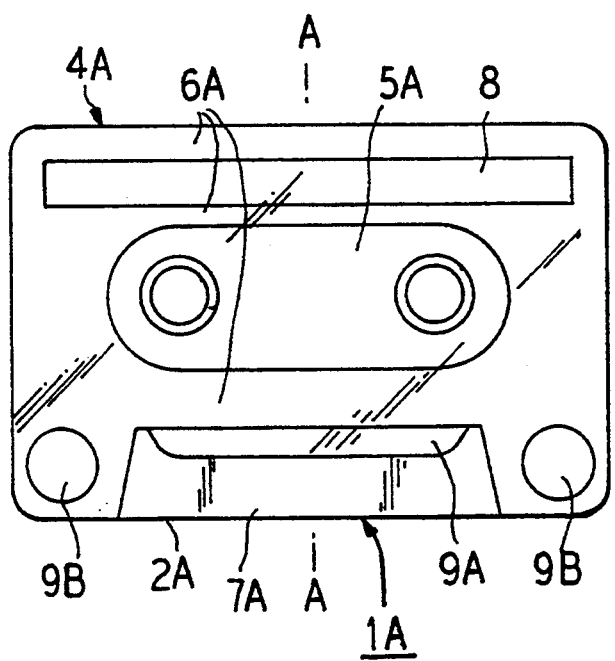
FIG. 12A is a plan view of a half case of a compact tape cassette, formed by an injection molding method in a third embodiment according to the present invention.
Figure 12B:
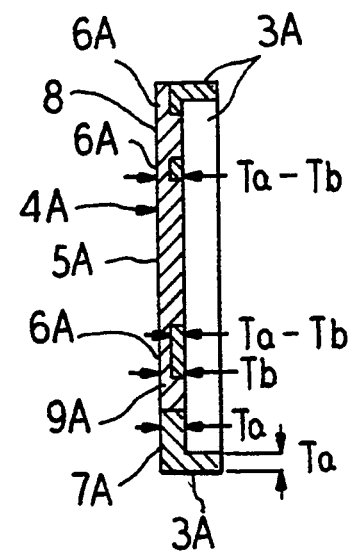
FIG. 12B is a sectional view taken on line A—A in FIG. 12A.

Referring to FIGS. 12A and 12B, a half case 1A, i.e., a front half case of a compact tape cassette, has a bottom wall 4A, a side wall 2A extending along one side edge of the bottom wall 4A so as to expose a magnetic tape, not shown, contained in the compact tape cassette, and a rim 3A extending along the three side edges of the bottom wall 4A. The bottom wall 4A is provided with a transparent window 5A to enable observation of the magnetic tape contained in the compact tape cassette, a transparent labeling section 8 determining a labeling area and enabling observation of the internal mechanism of the compact tape cassette, a decorative transparent section 9A allowing observation of a pad, decorative transparent sections 9B allowing observation of guide rollers, and covering sections 6A and 7A. For example, the rim 3A and the covering section 7A are formed of an opaque molding material of a color in a single-layer construction, the window 5A is formed of a transparent or translucent molding material of a color in a single-layer construction, the covering section 6A is formed in a two-layer laminate construction consisting of a lower layer formed of the same material as that forming the covering section 7A integrally with the covering section 7A, and an upper layer formed of the same material as that forming the window 5A integrally with the window 5A.

The injection molding machine in the second embodiment according to the present invention employs an injection molding die unit 200 shown in FIG. 9 consisting of a fixed die assembly 200A and a movable die assembly 200B.

The fixed die assembly 200A shown in FIG. 9 is substantially the same in construction as the fixed die assembly 10A shown in FIG. 1, except that the fixed die assembly 200A is not provided with any rod corresponding to the rod 23 of the fixed die assembly 10A shown in FIG. 1 and a support rod 233 included in the movable die assembly 200B is substituted for the rod 23. Therefore, parts shown in FIG. 9 like or corresponding to those shown in FIG. 1 are denoted by the same reference characters and the description thereof will be omitted to avoid duplication. Although a single support rod 233 is shown in FIG. 9 for the sake of convenience, it is desirable to provide the movable die assembly 200B with a plurality of support rods in an appropriate arrangement so that the support rods may not obstruct the ejection of a molding.

The movable die assembly 200B has a composite male die 30 consisting of a movable male die 30A and a movable male die 30B. Most part of the movable male die 30B lies between a base plate 32 and the movable male die 30A. A protruding part of the movable male die 30B protrudes to the right through the movable male die 30A. The right end surface 202 of the movable male die 30A and the right end surface 203 of the protruding part of the movable male die 30B form a cavity surface corresponding to the window 5 of the half case 1A. This cavity surface and the right end surfaces 201 and 202 of the movable male die 30A form a cavity surface corresponding to the inner surface of the half case 1A. The movable male dies 30A and 30B are provided respectively with guide holes 31A and 31B, and the support rod 233 attached perpendicularly to the base plate 32 is received in the guide holes 31A and 31B to guide the movable male die 30B for movement toward the movable male die 30a and further toward a female die 14 included in the fixed die assembly 200A. A hydraulic cylinder actuator 50 built in the movable male die 30B moves the movable male die 30B along the support rod 233. The support rod 233 guides also the movable male die 30A for movement toward the male die 14 of the fixed die assembly 200A and for slight movement toward the movable male die 30B. The distance of movement of the movable male die 30A toward the movable male die 30B is determined by a positioning rod 234. When the fixed die assembly 200A and the movable die assembly 200B are joined together, the front portion of the support rod 233 is received in a guide hole 22 formed in a movable female die 14B included in the fixed die assembly 200A to guide the movable female die 14B for movement toward the movable die assembly 200B. It is desirable to provide the movable die assembly 200B with as many support rods as possible to apply clamping force uniformly to the injection molding die unit 200. The movable male dies 30A and 30B are provided respectively with recesses 235 and 236. A headed rod 237 is put on the movable die assembly 200B with its head received in the recess 235 and its straight section received in the recess 236. A coil spring 238 is placed in the recess 236 around the straight section of the headed rod 237 to urge the movable male die 30A constantly toward the fixed die assembly 200A.

The hydraulic cylinder actuator 50 has a pressure chamber 51 formed in the left end of the movable male die 30B, a piston 52 fitted in the pressure chamber 51, a piston ring 53 put on the circumference of the piston 52, and a shaft 54 having one end fixed to the piston 52 and the other end fixed to the base plate 32. Naturally, the hydraulic cylinder actuator 50 may be substituted by the hydraulic cylinder actuator shown in FIGS. 7A and 7B or in FIGS. 8A and 8B.

Naturally, the injection molding machine in the second embodiment needs a mechanism similar to the mechanism comprising the ejecting pin 37, the return pin 38, the ejecting plate 39 and the ejecting rod 40, included in the injection molding machine in the first embodiment shown in FIG. 1, for removing a molding from the male die 30. The description of the mechanism will be omitted for the sake of simplicity.

An injection molding method employing the injection molding die unit 200 thus constructed will be described hereinafter with reference to FIGS. 10 and 11 as applied to molding the half case 1A shown in FIGS. 12A and 12B.

The injection molding die unit 200 shown in FIG. 10 is in a state for molding a first molding 70A. The injection molding die unit 200 is mounted on the injection molding machine with the fixed die assembly 200A fixed to a fixed member of the injection molding machine and the movable die assembly 200B fixed to a die base, not shown, connected to a hydraulic device. The movable die assembly 200B is pressed in the direction of the arrow X by a predetermined pressure to close the injection molding die unit 200.

Hydraulic pressure is applied to a front chamber Pa of the hydraulic cylinder actuator 50 to move the movable male die 30B together with the movable male die 30A in the direction of the arrow R by a distance corresponding to the thickness Ta of the walls of the half case 1A. Consequently, the upper and lower recessed surfaces of the movable male die 30A come into contact with the upper and lower protruding surfaces of the movable male die 14B of the composite female die 14 and press the movable female die 14B against the resilience of the coil spring 29 to press the back surface of the movable female die 14B against the holding plate 13. The front end of the support rod 233 advances into the guide hole 22 and comes into contact with the holding plate 13 to limit the advancement of the movable male die 30A and the movable male die 30B. The distance between the end surface of the movable male die 30B and the corresponding end surface of the movable female die 14B is equal to the thickness Ta of the covering section 7A and the first layer of the rim 3A (FIG. 12B), is equal to the thickness Ta of the bottom wall. The distance between the cavity surface of the movable male die 30B and the cavity surface of the fixed male die 14A, i.e., the thickness of the first layer of the covering section 6A (FIG. 12B) is Ta−Tb, where Tb is the thickness of the second layer 80A (FIG. 11). A first molding material, such as a plastic resin of a first color, for example, black, is injected in the spaces through the gate 17 of a first injection device 15 to form a first molding of the first color forming a first layer, and then the first molding is cooled.

Then, hydraulic pressure is applied to a back chamber Pb of the hydraulic cylinder actuator 50 to move the male die 30 of the movable die assembly 200B together with the first molding in the direction of the arrow La as shown in FIG. 11. When the male die 30 is thus moved, the movable male die 30B moves by a distance equal to the thickness Tb and the movement of the movable male die 30A is limited by the positioning rod 234 to form a gap of a width equal to the difference between the thickness Ta and Tb, i.e., Ta−Tb, between the back surface of the movable male die 30a and the front surface of the movable male die 30B. In this state, the back surface of the movable male die 30B is in contact with the surface of the base plate 32. At the same time, the movable female die 14B is moved in the direction of the arrow Lb by the resilience of the coil spring 29 to keep the upper and lower protruding surfaces of the movable female die 14B in contact with the corresponding upper and lower recessed surfaces of the male die 30. Thus, the cavity surface of the movable female die 14B becomes flush with the cavity surface of the fixed female die 14A (the state of the cavity surface of the female die 14 shown in FIG. 9) and a space of the width Tb is formed between the cavity surface of the female die 14 and the free surface of the first molding 70A closely adhering to the core surface of the male die 30. A second molding is formed in this space and a space defined by the cavity surface of the movable male die 30A and the cavity surface of the fixed female die 14A. Portions of these spaces correspond respectively to the window 5A, a labeling section 8, the transparent section 9A and the upper layer of the covering section 6A.

A second molding material, for example, a transparent plastic resin of a second color, is injected for the second injection molding cycle into those spaces through the gate 20 of a second injection device to form a second molding 80A of a second color forming the second layer, and then the second molding 80A is cooled. In the second injection molding cycle, the window 5A, the labeling section 8 and the transparent section 9A are formed in a single-layer construction. Other sections including the covering sections 6A and 6B are formed in a two-layer construction and these sections appear through the transparent second molding 80A in the color of the first molding, i.e., black, formed by the first injection molding cycle.

Then, the hydraulic device is operated to separate the movable die assembly 200B from the fixed die assembly 200A and then the half case 1A of a two-layer construction is removed from the male die 30 and ejected from the injection molding die unit 200 by the ejecting mechanism.

As is obvious from the foregoing description, since the movable die assembly is provided with the built-in hydraulic cylinder actuator and the positioning mechanism, the cavity-back mechanism and the core-back mechanism essential to the prior art can be omitted, and the injection molding die unit 200 has a very simple construction.

An injection molding machine in a third embodiment according to the present invention suitable for carrying out an injection molding method of a body-back system in accordance with the present invention capable of preventing dimples attributable to a gate drop in transparent sections, such as the window of a half case of a tape cassette will be described with reference to FIGS. 13 to 17.

Figure 13:
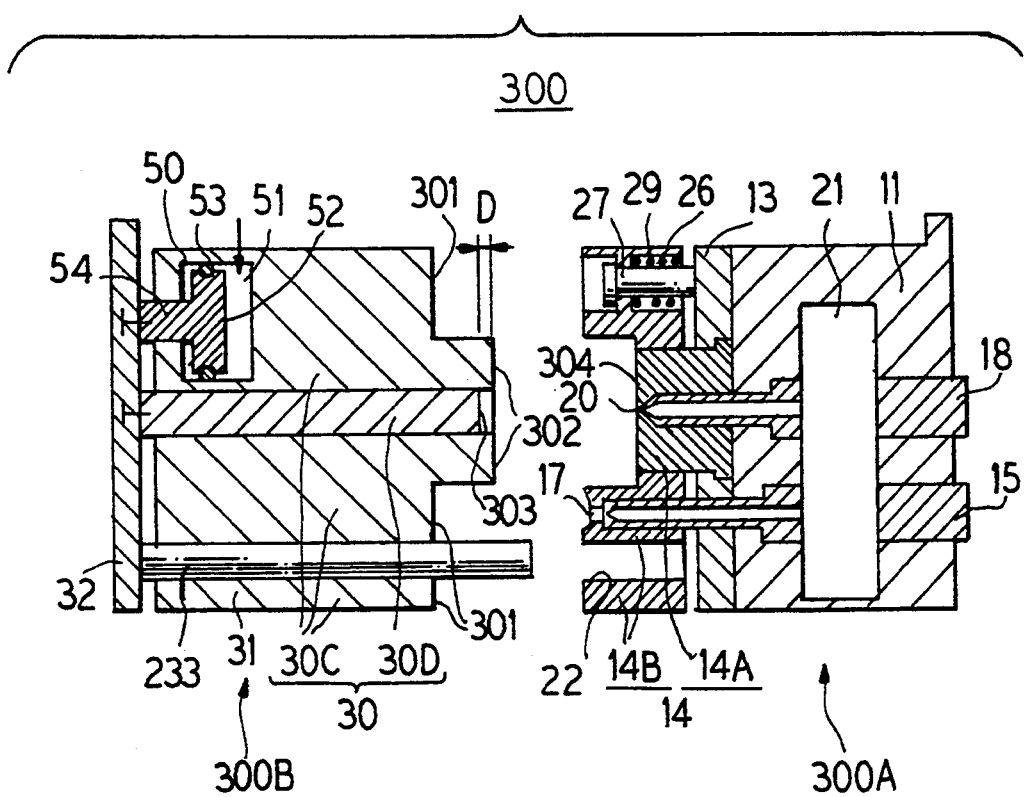
FIG. 13 is a sectional view of an injection molding die unit included in an injection molding machine in a third embodiment according to the present invention.
Figure 14:
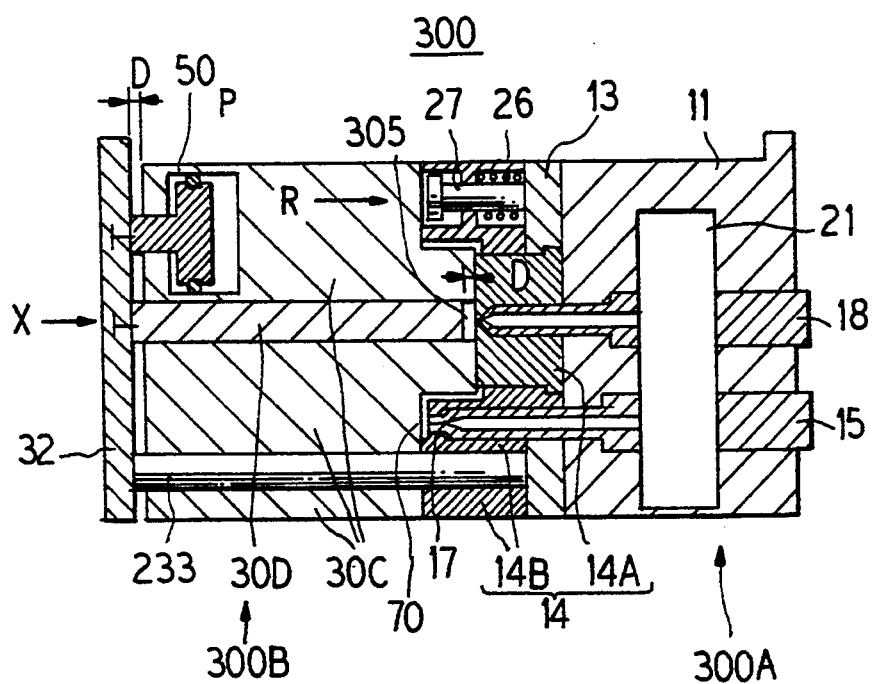
FIG. 14 is a sectional view of assistance in explaining the operation of the injection molding machine in the third embodiment according to the present invention.
Figure 15:
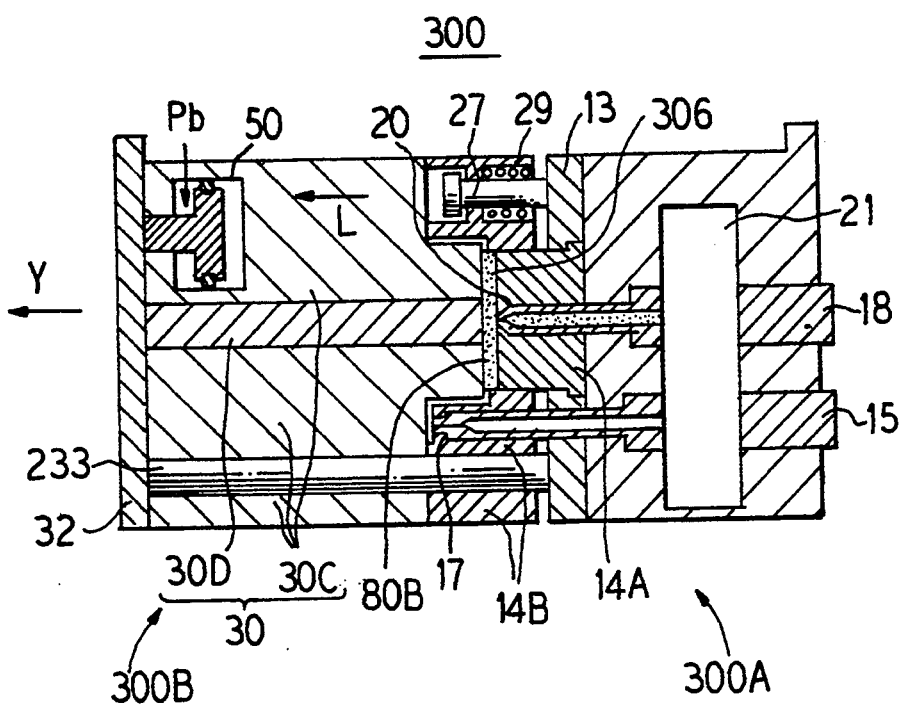
FIG. 15 is a sectional view of assistance in explaining the operation of the injection molding machine in the third embodiment according to the present invention.
Figure 16A:
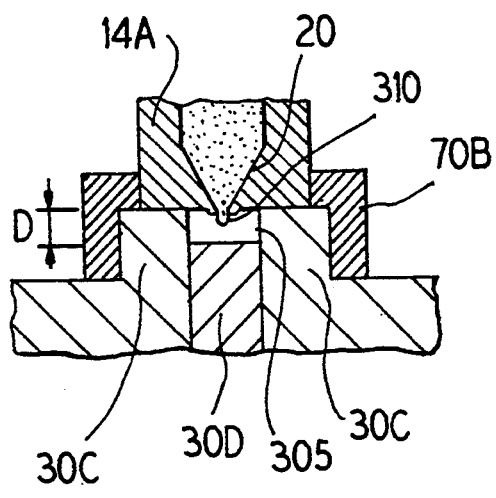
FIGS. 16A and 16B are enlarged sectional views of assistance in explaining a gate drop, showing a portion in the vicinity of a second gate in an injection molding die.
Figure 16B:
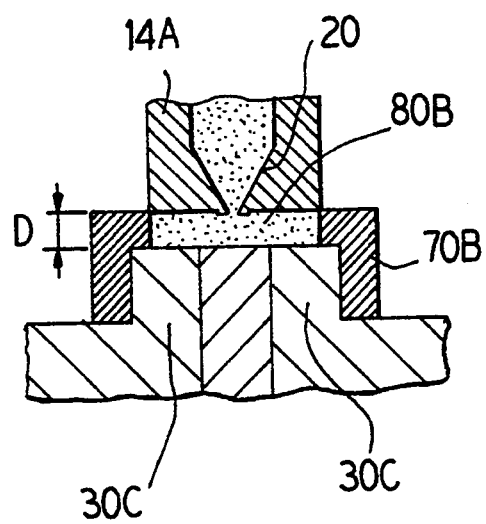
Figure 17:
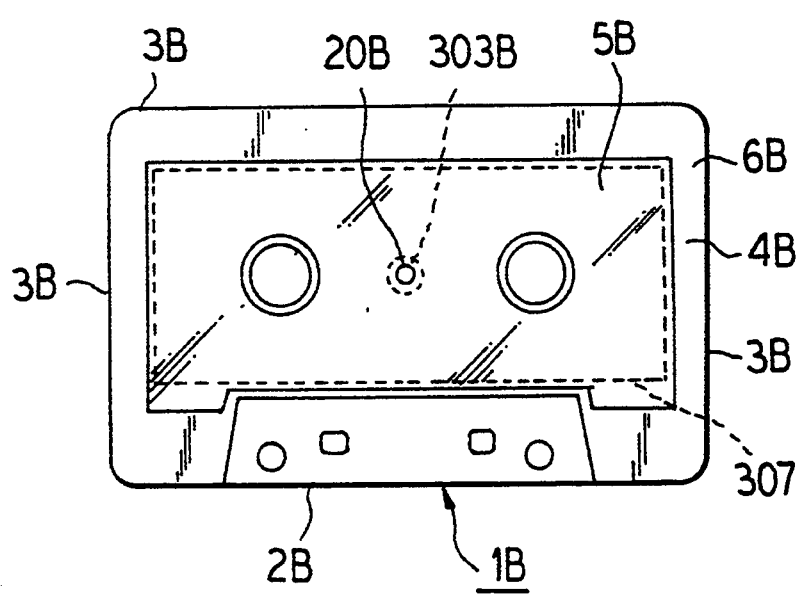
FIG. 17 is a plan view of a half case of a compact tape cassette, formed by an injection molding method in accordance with the present invention.
Figure 18:
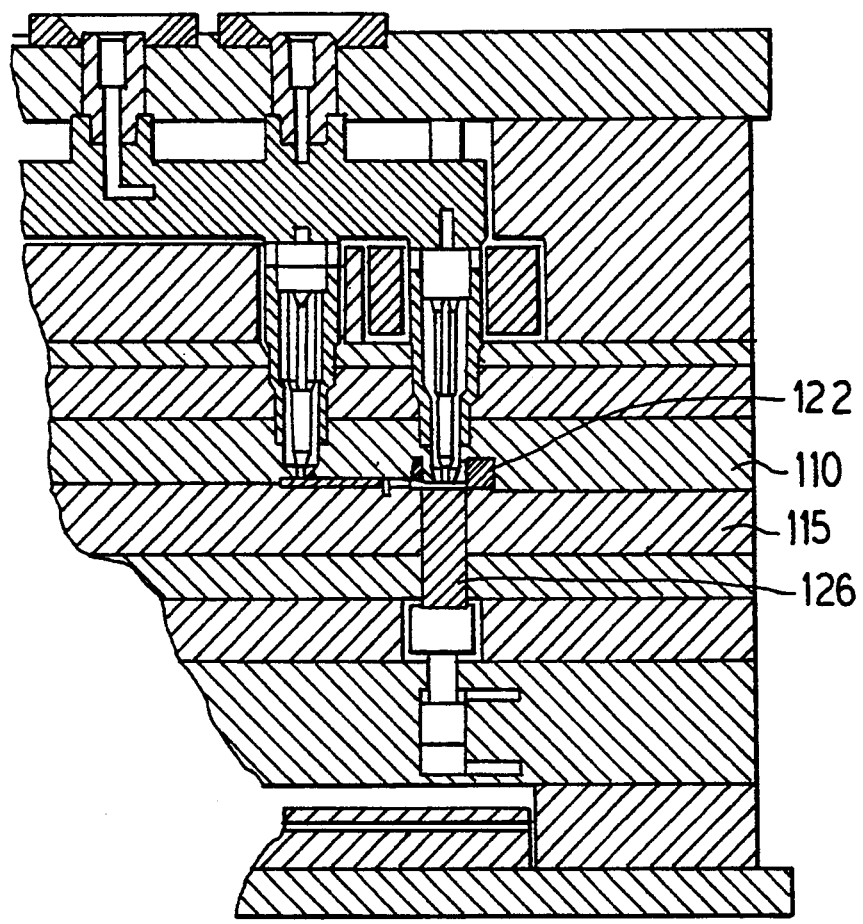
FIG. 18 is a fragmentary sectional view of assistance in explaining a prior art injection molding method.
Figure 19A:
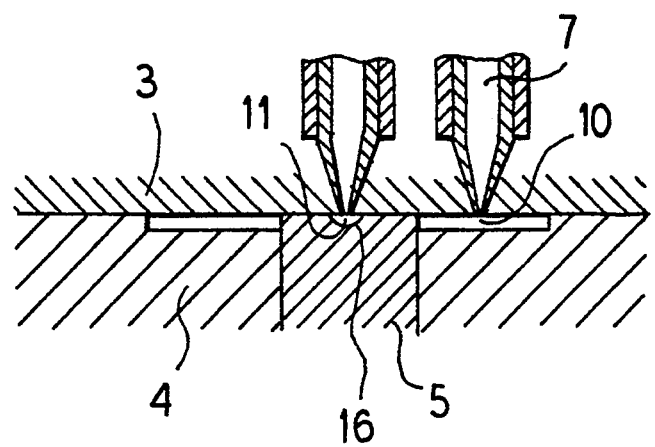
FIG. 19A and 19B is a fragmentary sectional view of assistance in explaining measures for solving problems attributable to a gate drop in carrying out a prior art injection molding method.
Figure 19B:
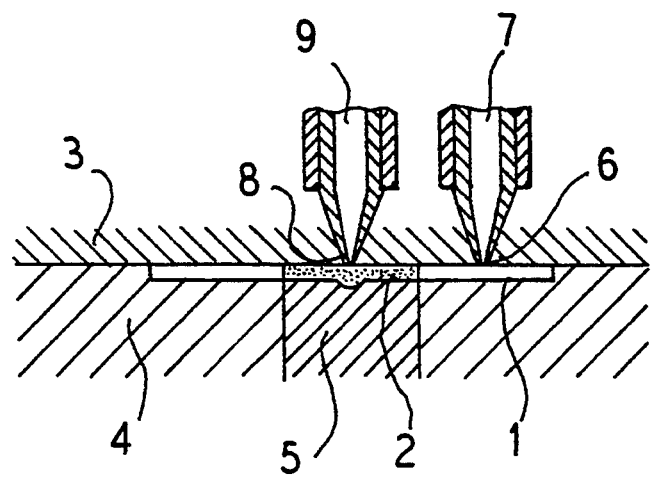

FIG. 13 is a sectional view of a molding die unit employed in the injection molding machine in the third embodiment according to the present invention, FIG. 14 shows the molding die unit of FIG. 13 in a state after the completion of the first injection molding cycle for forming a first molding, FIG. 15 shows the molding die unit in a state after the completion of the second injection molding cycle for forming a second molding, FIGS. 16A and 16B are enlarged, fragmentary sectional views of assistance in explaining a gate drop and FIG. 17 shows a half case of a compact tape cassette molded by the injection molding method of a back-body molding system, in which parts like or corresponding to those of the molding die units 10 and 200 shown in FIGS. 1 to 12B are denoted by the same reference characters.

First a half case 1B of a compact tape cassette molded by the injection molding method of the present invention will be described with reference to FIG. 17. The half case 1B has a bottom wall 4B, a side wall 2B extending along one side edge of the bottom wall 4B and having an opening through which a magnetic tape, not shown, contained in the compact tape cassette is exposed, and a rim 3B extending along the other three sides of the bottom wall 4B. The bottom wall 4B has a transparent or translucent window 5B to enable observation of the magnetic tape contained in the compact tape cassette, and an opaque covering section 6B, i.e., a hatched area in FIG. 17. The rim 3B and the covering section 6B are formed of an opaque molding material of a color in a single-layer construction, and the window 5B is formed of a transparent molding material of a color in a single-layer construction. All the portions of the half case 1B are the same in thickness.

Referring to FIG. 13, an injection molding die unit 300 employed in the injection molding machine in the third embodiment consists of a fixed die assembly 300A and a movable die assembly 300B.

The fixed die assembly 300A is the same in construction as the fixed die assembly 200A shown in FIG. 9 and hence the description thereof will be omitted to avoid duplication.

The movable die assembly 300B has a male die 30 consisting of a movable male die 30C and a fixed male die 30D penetrating the central portion of the movable male die 30C. The right end surfaces 301 and 302 of the movable male die 30C and the right end surface 303 form a core surface corresponding to the inner surface of the half case 1B. The right end surfaces 302 and 303 form a core surface corresponding to the transparent or translucent window 5B. In FIG. 13, the movable male die 30C is moved toward the female die 14 of the fixed die assembly 300A. The movement of the movable male die 30C toward the female die 14 is limited by the base plate 32 so that the right end surface 302 of the movable male die 30C projects from the right end surface 303 of the fixed male die 30D by a distance D. The distance D is large enough to form a space large enough to contain a gate drop 310 as shown in FIG. 16A and corresponds to the thickness of a second molding 80B, which is equal to the thickness of a first molding 70B, i.e., the thickness of the walls of the half case 1B.

The movable male die 30C is provided with a guide hole 31, and a support rod 233 attached perpendicularly to the base plate 32 is received in the guide hole 31 to guide the movable male die 30C when the movable male die 30C is moved toward the female die 14 of the fixed die assembly 300A by a hydraulic cylinder actuator 50 built in the movable male die 30C. When the fixed die assembly 300A and the movable die assembly 300B are joined together, the front end of the support rod 233 advances into a guide hole 22 formed in the movable female die 14B of the fixed die assembly 300A to guide the movable female die 14B for movement toward the movable die assembly 300B. As mentioned in the description of the second embodiment, it is desirable to provide as many support rods as possible to apply clamping force uniformly to the injection molding die unit 300 in an arrangement that may not obstruct the ejection of a molding.

The hydraulic cylinder actuator 50 built in the left end portion of the movable male die 30C is the same in construction as those described with reference to FIGS. 1 and 9 and hence the description thereof will be omitted.

The injection molding machine in the third embodiment is provided with an ejecting mechanism similar to that employed in the first embodiment, comprising the ejector pin 37, the return pin 38, the ejecting plate 39 and the ejecting rod 40, which is not shown in FIGS. 13 to 15 for the sake of simplicity.

Steps of the injection molding method employing the injection molding die unit 300 thus constructed for molding the half case 1B shown in FIG. 17 will be described hereinafter with reference to FIGS. 14 and 15.

In FIG. 14, the injection molding die unit 300 is in a state for molding a first molding 70B. The injection molding die unit 300 is mounted, similarly to those employed in the first and second embodiments, on the injection molding machine and a predetermined pressure is applied to the movable die assembly 300B of the injection molding die unit 300 in the direction of the arrow X for die clamping.

After the injection molding die unit 300 has been closed, hydraulic pressure is applied to a front chamber Pa of the built-in hydraulic cylinder actuator 50 to move the movable male die 30C together with the movable male die 30A in the direction of the arrow R by a distance equal to the wall thickness D of the half case 1B. The upper and lower recessed surfaces 301 of the movable male die 30C come into contact with the corresponding upper and lower protruding surfaces of the movable female die 14B of the female die 14 to move the movable female die 14B against the resilience of the coil spring 29 so that the back surface of the movable female die 14B is pressed against the holding plate 13. The front end of the support rod 233 advances through the guide hole 22 and comes into contact with the holding plate 13 to limit the advancement of the movable male dies 30A and 30C. In this state, the central core surface 302 of the movable male die 30C is in contact with the cavity surface 304 of the fixed female die 14A. Thus, the space 305 shown in FIG. 16A is formed between the fixed female die 14A and the fixed male die 30D facing the gate 20 of the fixed female die 14A.

Thus, a space of a width equal to the thickness of the covering section 6B (FIG. 17), i.e., a space for forming the first molding 70B (FIG. 16A), is defined by the core surface of the movable male die 30C and the cavity surfaces of the fixed female die 14A and the movable female die 14B. A first molding material, for example, a plastic resin of a first color, such as black, is injected into the space for forming the first molding 70B through the gate 17 of the first injection device 15 to mold the first molding 70B, and then the first molding 70B is cooled.

In the state shown in FIG. 14, hydraulic pressure is removed from the front chamber Pa and applied to a back chamber Pb. Then, as shown in FIG. 15, the movable male die 30C of the movable die assembly 300B moves together with the first molding 70B in the direction of the arrow L by a distance equal to the wall thickness D. In this state, the back surface of the movable male die 30C is in close contact with the base plate 32 and the core surface 302 of the movable male die 30C is flush with the core surface 303 of the fixed male die 30D. At the same time, the movable female die 14B is moved in the direction of the arrow L by the coil spring 29 as the movable male die 30C moves in the direction of the arrow L. The upper and lower protruding surface of the movable female die 14B remain in contact with the corresponding upper and lower recessed surfaces of the male die 30 as the movable female die 14B is moved in the direction of the arrow L. Consequently, the cavity surface of the movable female die 14B becomes flush with the cavity surface of the fixed female die 14A to form the cavity surface of the female die 14 as shown in FIG. 13 and a space 306 of a width equal to the wall thickness D (FIG. 16B) is formed between the cavity surface of the female die 14 and the core surface of the male die 30. The space 306 corresponds to the window 5B of the half case 1B of FIG. 17.

Then, as shown in FIG. 15, a second molding material, for example, a transparent plastic resin of a second color, is injected into the space 306 to form a second molding 80B, i.e., the window 5B. Thus, the half case 1B integrally consisting of the covering section 6B and the window 5B is completed. If there is a gate drop 310 in the gate 20 in injecting the second molding material into the space 306, the gate drop 310 is melted by the heat of the second molding material and disperses in the second molding material, so that any grooves of a pattern spoiling the design of the half case 1B, which is the disadvantage of the prior art, are not formed around the window 5B.

Then, hydraulic device is operated to move the movable die assembly 300B in the direction of the arrow Y to open the injection molding die unit 300, and the half case 1B is removed from the male die 30 and ejected from the injection molding die unit 300.

It is essential that the area of the core surface 303 of the fixed male die 30D is greater at least than the area of the tip of the gate 20. It was found through experiments that the half case can be satisfactorily molded when the gate 20 has a circular tip of 3 mm in diameter and the core surface 303 has a circular shape of 4 mm in diameter. In FIG. 17, a circle 20B corresponds to the circular tip of the gate 20 and a circle 303B corresponds to the circular core surface 303 of the fixed male die 30D. The size and shape of the core surface 303 may be selectively determined taking into consideration the size and shape of a molding to be formed. If necessary, the core surface 303 of the fixed male die 30D may be as large as an area 307 enclosed by dotted lines in FIG. 17, which is nearly equal to the entire area of the window 5B.

As is obvious from the foregoing description of the third embodiment, since the movable die assembly is provided with the built-in hydraulic cylinder actuator and the positioning mechanism, the cavity-back mechanism and the core-back mechanism, which are essential to the prior art, may be omitted, which simplifies the construction of the molding die unit greatly. Since the fixed male die 30D is fixedly connected to the base plate 32, the fixed male die 30D can be easily cooled.

Furthermore, even if there is a gate drop 310 in the gate 20 as shown in FIG. 16A in injecting the second molding material into the molding die unit, a portion of the end surface of the molding die facing the gate 20 is not damaged because the fixed male die 30D of the movable die assembly 300B is formed so that the space 305 is formed between the end surface of the fixed male die 30D and the gate 20. Still further, since any grooves of a pattern spoiling the design of the half case are not formed around the window, a half case of high aesthetic quality can be molded in the molding die unit. Since any portion having a reduced thickness is not formed around the window, problems in the strength of the half case is solved.

Although the invention has been described in its preferred forms with a certain degree of particularity, obviously many changes and variations are possible therein. It is to be understood that the present invention may be practiced otherwise than as specifically described herein without departing the spirit and scope thereof.

What is claimed is:

1. A method of molding a composite molding by sequentially injecting molding materials differing from each other in quality into spaces sequentially formed in an injection molding die unit consisting of two mating molding die assemblies, said method comprising steps of:
   providing a first mating molding die assembly and a second mating molding die assembly, the second mating molding die assembly having an inner molding face and a surrounding molding face movable in an axial direction with respect to said inner molding face;
   forming a first molding by injecting a first molding material for a first injection molding cycle into a first space formed by the first and the second mating molding die assemblies;
   cooling the first molding;
   moving the first mating molding die assembly and the surrounding molding face of the second mating molding die assembly together with the first molding along the axial direction by a distance equal to the width of a second space into which a second molding material is to be injected by urging the surrounding molding face resiliently toward the first mating molding die assembly;
   providing a mechanical axial movement restriction between the inner molding face and the surrounding molding face corresponding to said distance;
   restricting axial movement between said inner molding face and the surrounding molding face by said axial movement restriction during said moving;
   forming a second molding by injecting the second molding material for the second injection molding cycle into the second space;
   cooling the second molding.

2. A method of molding a composite molding by sequentially injecting molding materials differing from each other in quality into spaces sequentially formed in an injection molding die unit consisting of two mating molding die assemblies, said method comprising steps of: forming a first molding by injecting a first molding material for the first injection molding cycle into a first space formed by the two mating molding die assemblies;
   cooling the first molding;
   moving one of the two mating molding die assemblies together with the first molding and a first component die of the other molding die assembly by a distance equal to the width of a second space into which a second molding material is to be injected while restricting movement of a second component die of the other molding die assembly;
   providing an axial movement restriction between said first and second component dies;
   providing a means for urging said first component die toward said one of the two mating molding die assemblies;
   restricting axial movement between said inner molding face and the surrounding molding face by said axial movement restriction during said moving;
   forming a second molding by injecting the second molding material into the second space; and
   cooling the second molding.

3. A method of molding a composite molding, according to claim 2, wherein said one molding die assembly moved to form the second space for injecting the second molding material is a male molding die assembly, and said other molding die assembly is a female molding die assembly.

4. A method of molding a composite molding, according to claim 2, wherein the one molding die assembly is attached to a movable die base of an injection molding machine, the other molding die assembly is attached to a fixed member of the injection molding machine with the first die component movable and the second die component fixed, the one molding die assembly is moved toward the other molding die assembly by a distance to define a space for forming the first molding between the one and other molding die assemblies, and the first component die of the other molding die unit is moved, after forming the first molding, together with the first molding toward the movable die base by said means for urging so that a space of a width equal to the thickness of a second molding to be formed between the end surface of the movable die of the one molding die assembly and at least the end surface of the second die component of the other molding die assembly.

5. A method of molding a composite molding, according to claim 2, wherein the first die component and the second die component comprise a fixed die and a movable die respectively, the fixed die is fixed to the support member of the injection molding machine with a holding plate, the movable die is urged by said means for urging so that a gap of a predetermined size equal to the thickness of the second molding is formed between the movable die and the holding plate, a cavity surface is formed by both the movable die and the fixed die, and the movable die can be moved by the molding die assembly toward the other molding assembly against the urging force of the means for urging so as to be brought into contact with the holding plate.

6. A method of molding a composite molding, according to claim 4, wherein the first die component is disposed between the second die component and the fixed member of the injection molding machine with a protruding portion thereof extending through the second die component, and an end surface of the protruding portion of the first die component is able to be flush with an end surface of the second die component during the injection of said first molding material into said first space and is retracted from being flush during the movement of said one molding die assembly to form said second space.

7. A method of molding a composite molding by sequentially injecting molding materials differing from each other in quality into spaces sequentially formed in a molding die unit having first and second mating molding die assemblies, by injecting a first molding material into a first space to form a first molding, and moving one of the two mating molding die assemblies together with the first molding by a distance equal to the thickness of a second molding to be formed by injecting a second molding material, said method comprising:

using a die component within the first molding die assembly, forming a second space of a width equal to the thickness of the second molding directly in front of an injection gate arranged in the second molding die assembly through which the second molding material is to be injected, by positioning and holding the die component facing the injection gate at a position set back from a front of the injection gate before executing a first injection molding cycle in which the first molding material is injected into the first space to form the first molding;

using the second space as a clearance to prevent contact fouling of a gate drop at the injection gate;

injecting the first molding material only into the first space formed between the two mating molding die assemblies, to form the first molding;

cooling the first molding;

moving the first molding die assembly supporting the first molding so that a molding end surface of the first molding die assembly becomes flush with an end surface of the die component eliminating the second space and forming a third space; and injecting the second molding material into the third space formed between the molding end surface of the first molding die assembly and the end surface of the die component and an end surface of the second molding die assembly, to form the second molding.

8. A method of molding a composite molding; according to claim 7, wherein one of the two mating molding die assemblies is a movable molding die assembly and the other is a fixed molding die assembly, the movable molding die assembly is attached to the movable die base of an injection molding machine, the fixed molding die assembly is attached to a fixed member of the injection molding machine, a fixed die included in the movable molding die assembly is disposed so as to form the second space of the width equal to the thickness of the second molding between the end surface thereof and the injection gate formed in a die of the fixed molding die assembly to inject the second molding material into the third space, a movable die included in the movable molding die assembly can be moved by a distance equal to the thickness of the second molding toward the fixed molding die assembly, the first space for molding the first molding is formed between the movable die of the movable molding die assembly and a movable die included in the fixed molding die assembly, and the movable die of the movable molding die assembly is moved together with the first molding by a pressing means after molding and cooling the first molding toward the movable die base so that the end surface of the movable die of the movable molding die assembly becomes flush with the end surface of the fixed die of the movable molding die assembly to form the third space of a width equal to the thickness of the second molding or that of the composite molding between the surface consisting of the end surfaces of the movable die and the fixed die of the movable molding die assembly and at least the end surface of the fixed die of the fixed molding die assembly.

9. The method of claim 1 comprising the additional steps of:

optionally repeating steps of moving the first mating molding die assembly together with the molding formed therein by a distance equal to a width of a subsequent space into which another molding material is to be injected for succeeding injection molding cycle, forming another molding by injecting another molding material into the subsequent space, and cooling the molding.

10. The method of claim 2 comprising the additional steps of:

optionally repeating steps of moving said one of the mating molding die assemblies together with the molding formed therein and a component die of the other molding die assembly by a distance equal to a width of a subsequent space into which another molding material is to be injected for a succeeding injection molding cycle, forming another molding by injecting another molding material into the subsequent space, and cooling the molding.

* * * * *